(12) United States Patent
Kinder et al.

(10) Patent No.: US 12,291,177 B2
(45) Date of Patent: May 6, 2025

(54) METHOD FOR TESTING A FUNCTION IN A HYDRAULIC VEHICLE POWER BRAKE SYSTEM

(71) Applicant: Robert Bosch GmbH, Stuttgart (DE)

(72) Inventors: Ralf Kinder, Auenstein (DE); Anatoly Malkin, Stuttgart (DE); Sabrina Lutz, Fellbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 147 days.

(21) Appl. No.: 17/915,394

(22) PCT Filed: Sep. 20, 2021

(86) PCT No.: PCT/EP2021/075781
§ 371 (c)(1),
(2) Date: Sep. 28, 2022

(87) PCT Pub. No.: WO2022/089835
PCT Pub. Date: May 5, 2022

(65) Prior Publication Data
US 2023/0127912 A1    Apr. 27, 2023

(30) Foreign Application Priority Data
Nov. 2, 2020   (DE) .............. 10 2020 213 766.8

(51) Int. Cl.
*B60T 17/22* (2006.01)
(52) U.S. Cl.
CPC .................. *B60T 17/221* (2013.01)

(58) Field of Classification Search
CPC .. B60T 17/221; B60T 2270/406; B60T 8/885; B60T 17/222; B60Y 2306/15; B60Y 2400/81
See application file for complete search history.

(56) References Cited

U.S. PATENT DOCUMENTS

2007/0035179 A1* 2/2007 Kling .................. B60T 17/221
                                                      303/122.09
2007/0108837 A1* 5/2007 Ohkubo ................. B60T 8/90
                                                      303/122.08
(Continued)

FOREIGN PATENT DOCUMENTS

DE    102016201047 A1    8/2016
DE    102018212850 A1    2/2020
(Continued)

OTHER PUBLICATIONS

International Search Report for PCT/EP2021/075781, Issued Dec. 9, 2021.

*Primary Examiner* — David J Bolduc
(74) *Attorney, Agent, or Firm* — NORTON ROSE FULBRIGHT US LLP

(57) ABSTRACT

In order to test a function in a pressure generating module of a hydraulic vehicle power brake system, it is provided to generate a brake pressure using a power brake pressure generator and subsequently hydraulically to separate a pressure regulating module from the pressure generating module by closing connection valves or hydraulically to separate wheel brakes from the pressure generating module by closing inlet valves, so that no brake fluid flows into the wheel brakes during the function test, which would reduce the brake pressure in the pressure generating module and negatively affect or prevent the function test.

8 Claims, 1 Drawing Sheet

(56) References Cited

U.S. PATENT DOCUMENTS

| | | | |
|---|---|---|---|
| 2007/0194621 A1* | 8/2007 | Ishizuka | B60T 8/4063 303/10 |
| 2008/0048491 A1* | 2/2008 | Matsubara | B60T 8/36 303/14 |
| 2012/0160619 A1* | 6/2012 | Isono | B60T 13/165 188/106 P |
| 2013/0304313 A1* | 11/2013 | Svensson | B60T 17/221 701/34.4 |
| 2016/0046274 A1* | 2/2016 | Matsuura | B60T 13/745 701/34.4 |
| 2016/0311422 A1* | 10/2016 | van Zanten | G01M 3/2869 |
| 2017/0158184 A1* | 6/2017 | Choi | B60T 17/221 |
| 2018/0297574 A1* | 10/2018 | Zimmermann | B60T 8/4081 |
| 2021/0291800 A1* | 9/2021 | Jesse | B60T 17/222 |
| 2022/0055599 A1* | 2/2022 | Moorman | B60T 13/146 |

FOREIGN PATENT DOCUMENTS

| | | |
|---|---|---|
| JP | 2010280383 A | 12/2010 |
| WO | 2020015886 A1 | 1/2020 |
| WO | 2020015887 A1 | 1/2020 |
| WO | 2020025188 A1 | 2/2020 |

\* cited by examiner

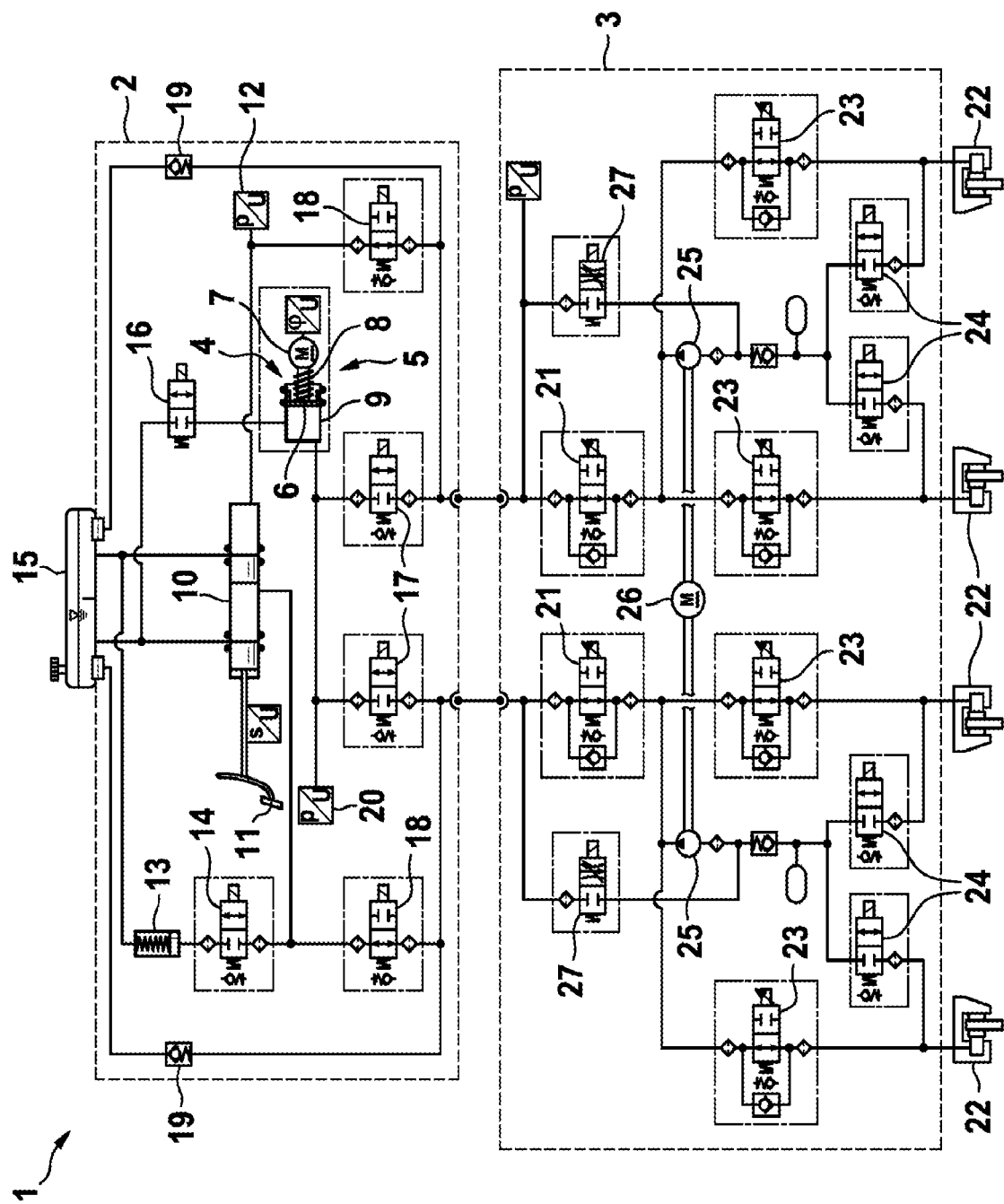

METHOD FOR TESTING A FUNCTION IN A HYDRAULIC VEHICLE POWER BRAKE SYSTEM

FIELD

The present invention relates to a method for testing a function in a pressure generating module of a hydraulic, in particular slip control-equipped, vehicle power brake system comprising the pressure generating module for generating power brake pressure and a pressure regulating module connected to the pressure generating module for regulating the brake pressure and/or for slip control.

BACKGROUND INFORMATION

German Patent Application No. DE 10 2016 201 047 A1 describes a hydraulic vehicle power brake system having a slip control comprising an electro-hydraulic power brake pressure generator in a pressure generating module and a pressure regulating module connected to the pressure generating module comprising a solenoid valve and return pumps for a slip control. For muscle-powered actuation, the known vehicle brake system includes a master brake cylinder integrated into the pressure generating module.

German Patent Application No. DE 10 2018 212 850 A1 describes a method for testing a functionality of a slip-controlled hydraulic vehicle power brake system. In each brake circuit, brake fluid is separately conveyed with a power brake pressure generator into a pressureless brake fluid reservoir through a non-actuated master brake cylinder. A non-opening separator valve, through which a brake circuit is connected to the master brake cylinder and which is not necessarily noticed when service braking is performed as power braking, is ascertained by a pressure increase using the method for checking the functionality of the vehicle brake system. A disadvantage of the known method is that brake fluid from the power brake pressure generator flows through opened inlet valves into hydraulic wheel brakes of the vehicle brake system, which delays a pressure buildup and negatively affects the testing. To prevent this volume drainage, hydraulic wheel brake inlet valves in the respective brake circuit can be closed during testing.

SUMMARY

A method according to the present invention is provided for performing a functional test in a pressure generating module of a hydraulic externally powered vehicle brake system, which preferably comprises a slip control. The function test serves to test a functionality of the pressure generating module or of hydraulic components, for example solenoid valves or check valves, of the pressure generating module.

The pressure generating module comprises a, in particular electro-hydraulic, power brake pressure generator. For example, the power brake pressure generator includes a piston-cylinder unit, whose piston is slidable in a cylinder of the piston-cylinder unit in order to generate power brake pressure by way of an electric motor via a worm gear or other rotation/translation converter gear. A further possibility of power brake pressure generator is an electric motor-driven hydraulic pump, for example a piston pump or an (inner) gear pump.

Through a connection valve that can be integrated into the pressure generating module or into a pressure regulating module, the pressure regulating module is connected to the pressure generating module. The pressure regulating module serves to regulate the brake pressure and preferably to provide a slip control; it has valves, in particular solenoid valves such as inlet valves and outlet valves for hydraulic wheel brakes, which are connected to the pressure regulating module, and optionally further hydraulic components, for example hydraulic accumulators and/or hydraulic pumps. The connection valve is normally present in vehicle power brake systems having a pressure-generating module and a pressure regulating module, for which reason the method according to the present invention normally does not require any additional valve and also no other modification of the respective vehicle power brake system.

The slip control is, in particular, an antilock control, traction slip control, and/or vehicle dynamics control, for which the abbreviations ALS, TCS, and/or VDC are commonly used. Such slip controls are known and will not be explained herein.

According to an example embodiment fo the present invention, to perform the function test, a brake pressure is generated with the power brake pressure generator and/or brake fluid is conveyed with the power brake pressure generator or displaced out of the power brake pressure generator. In order for brake fluid not to drain from the pressure generating module into the pressure regulating module or into the hydraulic wheel brakes during the function test, which would impact a pressure curve during the function test and negatively affect the function test, the present invention provides for generating a brake pressure in the pressure regulating module and preferably also in the wheel brakes with the power brake pressure generator or a hydraulic pump of the pressure regulating module, and subsequently for closing selectively the connection valve, through which the pressure regulating module is connected to the pressure generating module, and/or the inlet valves of the wheel brakes. The pressure regulating module, or in any case the wheel brakes, are thereby hydraulically separated from the pressure generating module, and the brake pressure is locked in the pressure regulating module or in any case in the wheel brakes. Subsequently, the function test is performed in the pressure generating module, wherein the generation of brake pressure with the power brake pressure generator and the sealing of the brake pressure in the pressure regulating module or in the wheel brakes can be considered as components of the function test or as preparatory method steps for the function test.

The hydraulic brake pressure in the vehicle brake system can be measured during the performance of the function test. In particular, a dependence of the pressure curve on an amount of brake fluid conveyed with the power brake pressure generator is assessed, which is different in a properly functioning vehicle brake system than when valves do not switch as designed for example.

The present invention prevents the pressure regulating module or the hydraulic wheel brakes from influencing the function test in the pressure generating module.

For example, the function test is used in order to test a functionality of hydraulic components of the pressure generating module.

Further developments and advantageous embodiments of the present invention are disclosed herein.

All features disclosed in the specification and the FIGURE can be realized individually, or in fundamentally any combination in embodiments of the present invention. Embodiments of the present invention which do not comprise all, but only one or more, features of an embodiment of the present invention are fundamentally possible.

BRIEF DESCRIPTION OF THE DRAWING

The present invention will be explained in further detail below on the basis of the drawing.

The FIGURE shows a hydraulic circuit diagram of vehicle power brake system for performing the method according to an example embodiment of the present invention.

DETAILED DESCRIPTION OF EXAMPLE EMBODIMENTS

The hydraulic vehicle power brake system 1 shown in the FIGURE is a dual circuit vehicle brake system with a slip control. The vehicle brake system 1 comprises a pressure generating module 2 and a pressure regulating module 3 connected to the pressure generating module 2. Hydraulic wheel brakes 22 are connected to the pressure regulating module 3.

The pressure generating module 2 comprises a power brake pressure generator 4 having a piston-cylinder unit 5, whose piston 6 is slidable by way of an electric motor 7 via a worm gear 8 in a cylinder 9 of the piston-cylinder unit 5 of the power brake pressure generator 4. The piston-cylinder unit 5 or the power brake pressure generator 4 as a whole can also be referred to as a plunger unit, its piston 6 as a plunger piston, and its cylinder 9 as a plunger cylinder.

To provide auxiliary braking in the event of a failure of the power brake pressure generator 4, the pressure generating module 2 comprises a dual-circuit master brake cylinder 10, which can be actuated through muscle power by means of a foot brake pedal 11 or optionally by means of a hand brake lever (not shown).

In service braking, in which brake pressure is generated with the power brake pressure generator 4, the master brake cylinder 10 serves as the setpoint device for the brake pressure to be generated with the power brake pressure generator 4. To this end, a pressure sensor 12 is connected to the master brake cylinder 10.

In service braking, the master brake cylinder 10 is hydraulically separated from the remaining vehicle brake system 1 by closing separator valves 18. In order to nevertheless be able to displace brake fluid out of the brake cylinder 10 during service braking and thereby move the master brake cylinder piston and the foot brake pedal 11, a pedal travel simulator 13 is connected to the master brake cylinder 10 via a simulator valve 14. The pedal travel simulator 13 is a piston-cylinder unit with a spring-loaded piston into the cylinder of which the brake fluid is displaceable from the master brake cylinder 10 when the separator valves 18 are closed and the simulator valve 14 is open.

Like the power brake pressure generator 4, the master brake cylinder 10 and the pedal travel simulator 13 are integrated into the pressure generating module 2.

A pressureless brake fluid reservoir 15 is mounted onto the pressure generating module 2, to which the master brake cylinder 10 and the cylinder 9 of the power brake pressure generator 4 are connected, the latter by power valve 16.

In each brake circuit, the pressure generating module 2 comprises a separator valve 17, 18 both for the power brake pressure generator 4 as well as for the master brake cylinder 10, via which the pressure regulating module 3 is connected to the pressure generating module 2 or the brake circuits of the pressure regulating module 3 are connected to the brake circuits of the pressure generating module 2.

In addition, check valves 19 are integrated into the pressure generating module 3, which connect brake fluid reservoir 15 to the sides of the separator valves 17, 18 facing away from the power brake pressure generator 4 and the master brake cylinder 10 and through which flow from the brake fluid reservoir 15 in the direction of the separator valves 17, 18 and thus to the pressure regulating module 3 is possible.

The pressure generating module 2 also comprises a pressure sensor 20 connected to the cylinder 9 of the power brake pressure generator 4.

The pressure regulating module 3 is connected in each brake circuit to the pressure generating module 2 by a connection valve 21.

The hydraulic wheel brakes 22 are connected to the pressure regulating module 3 by one inlet valve 23 in each case. In the exemplary embodiment, the vehicle brake system 1 comprises four wheel brakes 22, of which two are respectively connected to one brake circuit.

In each brake circuit, the wheel brakes 22 are connected to a suction side of a hydraulic pump 25, which can also be referred to as a return pump, via one outlet valve 24 per wheel brake 22. The vehicle brake system 1 comprises a hydraulic pump 25 in each brake circuit that can be driven jointly by an electric motor 26. Pressure sides of the hydraulic pumps 25 are connected between the connection valves 21 and the inlet valves 23.

Hydraulically parallel to the connection valves 21, the suction sides of the hydraulic pumps 25 are connected to the pressure generating module 2 by an inlet valve 27 in each brake circuit such that the hydraulic pumps 25 of the pressure regulating module 3 can draw brake fluid from the brake fluid reservoir 15 through the check valves 19 in the pressure generating module 2 and the suction valves 27 in the pressure regulating module 3 for a fast brake pressure buildup.

The connection valves 21, inlet valves 23, outlet valves 24 and suction valves, and hydraulic pumps 25 are integrated into the pressure regulating module 3.

The hydraulic pumps 25, inlet valves 23, and outlet valves 24 form brake pressure regulating valve assemblies that are capable of performing wheel-specific slip control, such as antilock control, traction slip control, and vehicle dynamics control. These slip controls are typically abbreviated to ALS, TCS, and VDC. Such slip controls are known and will not be explained herein.

The simulator valve 14, the power valve 16, the separator valves 17, 18, the connection valves 21, the inlet valves 23, the outlet valves 24, and the inlet valves 27 are 2/2-way solenoid valves, wherein the separator valves 18 of the master brake cylinder 10, the connection valves 21, and the inlet valves 23 are open in their currentless home positions, and the simulator valve 14, the power valve 16, the outlet valves 24, and the suction valves 27 are closed in their currentless home positions.

According to the present invention, a brake pressure is generated with the power brake pressure generator 4 in order to test the function of the pressure generating module 2 or of hydraulic components of the pressure generating module 2. In doing so, the separator valves 17 of power brake pressure generator 4, the connection valves 21, and the inlet valves 24 are opened or are opened so that the brake pressure generated with the power brake pressure generator 4 acts upon the pressure regulating module 3 and the wheel brakes 22. The separator valves 18 of the master brake cylinder 10 are closed so that no brake fluid is displaced from the cylinder 9 of the power brake pressure generator 4 into the master brake cylinder 10 and through the master brake cylinder 10 into the brake fluid reservoir 15. The outlet valves 24 remain closed in order to prevent brake fluid from exiting the wheel brakes 22.

Subsequently, the connection valves 21 are closed so that the pressure regulating module 3 is hydraulically separated from the pressure generating module 2 or the wheel brakes 22 are hydraulically separated from the pressure regulating module 3, and the brake pressure is "locked in," so to speak, in the pressure regulating module 3 or in the wheel brakes 22. Instead of the connection valves 21, it is also possible to close the inlet valves 23 if no check valve is hydraulically connected in parallel.

Now, the function test of the pressure generating module 2 can be performed without brake fluid from the pressure generating module 2 flowing into the pressure regulating module 3 or in any case into the wheel brakes 22, which would affect a pressure measurement in the pressure generating module 2 during the function test and would disrupt or even prevent the function test. For example, a pressure build-up with the power brake pressure generator 4 can be measured as to whether the brake pressure is maintained, that is, whether the separator valves 17, 18 and check valves 19 are tight, and whether the brake pressure drops when the separator valves 17, 18 are opened, that is, whether the separator valves 17, 18 open as designed.

In the event of a leakage of the closed connection valves 21 or the closed inlet valves 23, the brake pressure locked in the pressure regulating module 3 and/or in the wheel brakes 22 prevents the flow of brake fluid out of the pressure generating module 2 into the pressure regulating module 3 or into the wheel brakes 22.

During the function test, a vehicle equipped with the vehicle brake system 1 should remain stationary, because the vehicle brake system 1 is pressurized during the function test and therefore a normal actuation of the wheel brakes 22 is not possible or an actuation of the vehicle brake system 1 would terminate the function test.

What is claimed is:

1. A testing method for a hydraulic vehicle power brake system, the power brake system including (I) a pressure regulating module and (II) a pressure generating module, wherein the pressure generating module includes (i) a power brake pressure generator, (ii) a master brake cylinder, (iii) one or more power generator separating valves between an outlet arrangement of the power brake pressure generator and an outlet of the pressure generating module, (iv) one or more cylinder separating valves between an outlet arrangement of the master brake cylinder and the outlet of the pressure generating module, and the pressure regulating module includes (i) regulating module separating valves to which the outlet of the pressure generating module is connected such that the pressure generating module and the pressure regulating module are hydraulically connectable to each other by an open state of the regulating module separating valves and an open state of at least one of (a) the one or more power generator separating valves and (b) the cylinder separating valves, (ii) inlet valves via which brake fluid supplied by the pressure generating module to the pressure regulating module is applicable by the pressure regulating module to hydraulic wheel brakes, and (iii) outlet valves via which the brake fluid is returnable from the hydraulic wheel brakes, the returnable brake fluid being returnable from the wheel brakes to a brake fluid reservoir via the regulating module separating valves and the outlet of the pressure generating module, the method comprising:

(a) controlling the hydraulic vehicle power brake system to be in a first predefined state in which (i) the one or more cylinder separating valves are all closed so that the master brake cylinder is entirely separated from the pressure regulating module and from the power brake pressure generator, (ii) the one or more power generator separating valves are open, (iii) the regulating module separating valves are open so that the power brake pressure generator and the pressure regulating module are hydraulically connected via the open one or more power generator separating valves and the open regulating module separating valves, (iv) the inlet valves are open, and (v) the outlet valves are closed;

(b) while the hydraulic vehicle power brake system is in the first predefined state, generating a brake pressure by the power brake pressure generator, which is introduced into the pressure regulating module via the open one or more power generator separating valves and the open regulating module separating valves and applied by the pressure regulating module at the wheel brakes via the open inlet valves;

(c) subsequent to (b), closing the regulating module separating valves, thereby entering into a pressure locking state in which the pressure generating module is hydraulically disconnected from the pressure regulating module and the introduced brake pressure is locked in the pressure regulating module; and (d) while in the pressure locking state, performing a function test that tests functionality of the pressure generating module.

2. The method according to claim 1, wherein the power brake pressure generator is connected to the brake fluid reservoir by a power valve and/or by a check valve.

3. The method according to claim 1, wherein after the closing of the regulating module separating valves, the brake pressure or a brake pressure curve in the pressure generating module is measured and evaluated.

4. The method according to claim 1, wherein a vehicle equipped with the vehicle power brake system is stationary during performance of the method.

5. The method according to claim 1, wherein the power brake pressure generator and the master brake cylinder are hydraulically connectable to each other via the one or more power generator separating valves and the one or more cylinder separating valves when the one or more power generator separating valves and the one or more cylinder separating valves are simultaneously open.

6. The method according to claim 1, wherein the master brake cylinder is a dual-chamber master brake cylinder.

7. A hydraulic vehicle power brake system comprising:
   a pressure regulating module; and
   a pressure generating module;
   wherein:
   the pressure generating module includes:
      a power brake pressure generator;
      a master brake cylinder;
      one or more power generator separating valves between an outlet arrangement of the power brake pressure generator and an outlet of the pressure generating module;
      one or more cylinder separating valves between an outlet arrangement of the master brake cylinder and the outlet of the pressure generating module;
   the pressure regulating module includes:
      regulating module separating valves to which the outlet of the pressure generating module is connected such that the pressure generating module and the pressure regulating module are hydraulically connectable to each other by an open state of the regulating module separating valves and an open state of at least one of (a) the one or more power generator separating valves and (b) the cylinder separating valves;

inlet valves via which brake fluid supplied by the pressure generating module to the pressure regulating module is applicable by the pressure regulating module to hydraulic wheel brakes; and outlet valves via which the brake fluid is returnable from the hydraulic wheel brakes, the returnable brake fluid being returnable from the wheel brakes to a brake fluid reservoir via the regulating module separating valves and the outlet of the pressure generating module; and the hydraulic vehicle power brake system is configured for performance of a function test by performance of the following steps:

(a) controlling the hydraulic vehicle power brake system to be in a first predefined state in which (i) the one or more cylinder separating valves are all closed so that the master brake cylinder is entirely separated from the pressure regulating module and from the power brake pressure generator, (ii) the one or more power generator separating valves are open, (iii) the regulating module separating valves are open so that the power brake pressure generator and the pressure regulating module are hydraulically connected via the open one or more power generator separating valves and the open regulating module separating valves, (iv) the inlet valves are open, and (v) the outlet valves are closed;

(b) while the hydraulic vehicle power brake system is in the first predefined state, the power brake pressure generator generating a brake pressure, which is introduced into the pressure regulating module via the open one or more power generator separating valves and the open regulating module separating valves and applied by the pressure regulating module at the wheel brakes via the open inlet valves;

(c) subsequent to (b), closing the regulating module separating valves, thereby entering into a pressure locking state in which the pressure generating module is hydraulically disconnected from the pressure regulating module and the introduced brake pressure is locked in the pressure regulating module; and (d) while in the pressure locking state, testing functionality of the pressure generating module.

8. The hydraulic vehicle power brake system according to claim 7, wherein the master brake cylinder is a dual-chamber master brake cylinder.

* * * * *